April 10, 1928. 1,665,346

H. W. CLARKE

PIPE CONNECTION

Filed June 28, 1926

INVENTOR
H. W. CLARKE
By E. B. Birkenbeuel
ATTORNEY

Patented Apr. 10, 1928.

1,665,346

UNITED STATES PATENT OFFICE.

HARRY W. CLARKE, OF LONGVIEW, WASHINGTON.

PIPE CONNECTION.

Application filed June 28, 1926. Serial No. 118,949.

This invention relates generally to the pipe fitter's art, and particularly to a special form of connection between pipes, or between pipes and fittings.

The first object of this invention is to provide an exceedingly simple and efficient form of pipe connection whereby pipes may be securely and permanently joined together without the necessity of first forming threads thereon.

The second object is to so form the connection that the exact length of pipes being joined together is of much less importance than is ordinarily the case where threads are employed.

The third object is to make it possible for a pipe so connected to adjust itself for endwise expansion and contraction.

The fourth object is to form a pipe connection which will not deteriorate under vibration, or render it less efficient, due to the fact that pipes are often out of round.

The fifth object is to so construct the connection that it is easily adaptable for use in connection with valves and pipe fittings, and especially for the purpose of forming reducing couplings.

The sixth object is to so construct the connection that only ordinary skill is required to properly install same, and that the amount of time and physical effort required to perform this operation are relatively small.

Figure 1:
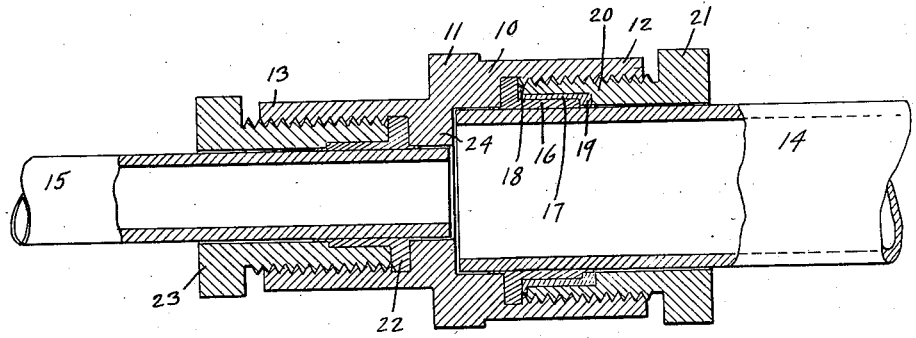
Figure 2:
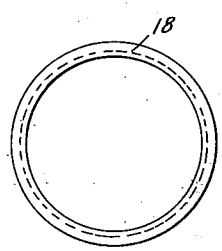
Figure 3:
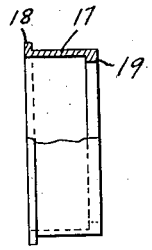
Figure 4:
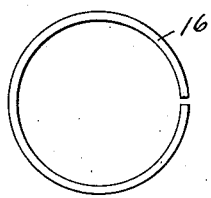
Figure 5:
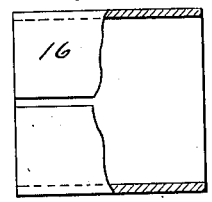

These, and other objects, will become more apparent from the specification following as illustrated in the accompanying drawing, in which:

Figure 1 is a longitudinal section through a representative form of coupling showing two methods of applying this device. Figure 2 is an end elevation of a compression ring preferably employed therein. Figure 3 is a side elevation of Figure 2 with a portion thereof broken away in section. Figure 4 is an end elevation of the soft metal packing sleeve of which Figure 5 is a side elevation with a portion thereof broken away in section.

Similar numbers of reference refer to the same parts throughout the several views.

Referring in detail to the drawing, the device itself consists of a body member 10 preferably provided with a hexagonal center 11, for convenience in applying a wrench. In the form illustrated, one end 12 of the body 10 is somewhat larger than the end 13, illustrating a convenient form of reducing coupling for the pipes 14 and 15. In the end 12 is inserted the pipe 14, around which is placed the sleeve 16 preferably split, as indicated, although not necessarily so, and is usually formed of a soft lead.

The compression ring 17 is provided with an outwardly turned flange 18 at one end and an inwardly turned flange 19 at the other end. A gland 20 is counterbored to receive the gland 19 and to bear against the flange 18. The nut 20 is also provided with a hexagonal end 21, for convenience in turning.

The end 13 of the body 10 is provided with a packing sleeve 22 and a gland 23 which are similar to those previously described, except that in this case the compression ring is omitted.

The operation of the device is as follows: When desiring to connect, for example, the pipes 14 and 15 it is only necessary to move their ends apart and slip the respective glands 21 and 23, the compression ring 17 and the packing sleeves 16 and 22 into position on the pipes. The end 13 is then slipped over the pipe 15, after which the pipes are brought into alignment and the fitting 10 is slipped around the larger pipe 14 until it strikes the central shoulder 24. The packing 16, for example, with its surrounding compression ring 17 is then slipped into the end 12, after which the threaded gland 20 is screwed into place with sufficient force to flow the metal of the sleeve 16 into every cavity around the pipe, and even into the clearance between the pipe 14 and the interior of the member 10.

The object of the compression ring is to reduce the tendency of the member 20 to rotate the packing, it being much more preferable to have the slippage between the harder members 17 and 20.

The result of this action is a completely tight joint, due to the fact that the lead has flowed into a perfect contact with the relatively rough exterior of the pipe 14.

By omitting the sleeve 17, as illustrated, in the smaller end 13 the cost is somewhat reduced, and this form can be employed where smaller sizes of pipe and lower pressures are employed, but on the larger sizes and for pressures such as would be carried for duty purposes, the compression ring is essential.

For certain classes of work it is preferable to provide the ordinary type of sliding gland to which power is applied by means of bolts, as is well understood.

I am aware that many forms of pipe connections have been invented in the past; I therefore do not claim such devices broadly, but I do intend to cover all such forms and modifications as fall fairly within the appended claims.

I claim:

1. A pipe connection having, in combination, a body member provided with a threaded recess through which a pipe can be passed; a lead cylindrical sleeve adapted to be slipped over said pipe into said recess; a cylindrical compression sleeve having its outer end inturned behind said lead sleeve and its inner end out-turned toward the threads in said recess; and a gland adapted to loosely receive said pipe and to be threaded into said recess, said gland having a counterbore formed therein whose inner end engages the inturned edge of said compression sleeve and whose outer end engages the out-turned edge of said sleeve in a manner to flow the metal in said lead sleeve between said pipe and its surrounding connection and between said pipe and the threads of said body member.

2. A pipe connection consisting of a body member having formed in each end thereof a recess adapted to loosely receive the end of an unthreaded pipe; and a larger threaded recess outside of the first mentioned recess; a lead sleeve adapted to surround said pipe and to be slipped into the space between the threads of said recess and the outside of said pipe; a gland adapted to loosely receive said pipe and to be screwed into said threaded recess and said gland having a counterbored end; and a compression sleeve within said counterbored end having one end inturned behind said lead sleeve and the other end out-turned against the end of said gland adapted to expand said lead sleeve against a pipe and into the threads of said body member.

HARRY W. CLARKE.